(12) United States Patent
Lin

(10) Patent No.: US 7,431,451 B1
(45) Date of Patent: Oct. 7, 2008

(54) NOSE-REST MECHANISM FOR SAFETY GLASSES

(75) Inventor: Chien-Mei Lin, Taipei (TW)

(73) Assignee: T-Link PPE Ltd. (TW)

( * ) Notice: Subject to any disclaimer, the term of this patent is extended or adjusted under 35 U.S.C. 154(b) by 0 days.

(21) Appl. No.: 11/954,341

(22) Filed: Dec. 12, 2007

(51) Int. Cl.
*G02C 5/12* (2006.01)

(52) U.S. Cl. .................. 351/138; 351/136; 351/139

(58) Field of Classification Search .......... 351/138, 351/139, 136, 78, 80, 65, 41, 110, 131, 132, 351/124, 137, 86, 83
See application file for complete search history.

(56) References Cited

U.S. PATENT DOCUMENTS

| | | | | |
|---|---|---|---|---|
| 4,951,322 A | * | 8/1990 | Lin | 2/439 |
| 5,032,017 A | * | 7/1991 | Bolle et al. | 351/116 |
| 5,257,050 A | * | 10/1993 | Wiedner | 351/86 |
| 6,948,810 B1 | * | 9/2005 | Kim | 351/57 |
| 7,347,545 B1 | * | 3/2008 | Jannard et al. | 351/106 |

* cited by examiner

*Primary Examiner*—Hung X Dang
(74) *Attorney, Agent, or Firm*—Schmeiser, Olsen & Watts

(57) ABSTRACT

A nose-rest mechanism for safety glasses includes a lens unit, a fixing device, and a nose piece. The nose piece includes two nose rests and a first extended section upward extended from between the two nose rests. The fixing device defines an inner receiving space adapted to receive and confine a middle bridge section of the lens unit and the first extended section of the nose piece thereto. The nose piece is provided on the first extended section with at least one projecting portion or at least one through hole for engaging with at least one retaining hole on the fixing device or at least one projecting section on the lens unit, respectively, enabling the nose piece to be easily, stably, and detachably connected to the lens unit via the fixing device while maintaining the safety glasses in a beautiful appearance.

22 Claims, 16 Drawing Sheets

NOSE-REST MECHANISM FOR SAFETY GLASSES

FIELD OF THE INVENTION

The present invention relates to a nose-rest mechanism for safety glasses, and more particularly to a nose-rest mechanism that enables a nose piece to be easily, stably, and detachably connected to a lens unit of safety glasses via a fixing device.

BACKGROUND OF THE INVENTION

FIGS. 1 and 2 are exploded and assembled perspective views, respectively, showing a conventional nose piece for safety glasses. As shown, the safety glasses include a frame 51, a left and a right lens 52, 53 mounted on the frame 51, two temples 54 separately connected to two lateral outer ends of the frame 51, and a nose piece 55 connected to a rear middle point of the frame 51.

In the above illustrated and described safety glasses, the nose piece 55 is connected to the frame 51 using screws 56. The screws 56 used for fastening the nose piece 55 to the frame 51 are usually small in volume and require specific tool, troublesome procedures, and a lot of time and labor to be tightened up against the nose piece 55 and the frame 51. Similarly, once fastened to the frame 51 using the specific screws 56, the nose piece 55 could be loosened from the frame 51 only with a tool matching the specification of the screws 56. Moreover, the nose piece 55 screwed to the frame 51 is subject to sway as the safety glasses are frequently put on and taken off, and finally becomes loose from the frame 51.

Therefore, it is desirable and tried by the inventor to develop a nose piece structure with a fixing device that enables an easy and stable connection of the nose piece structure to and between the lenses of the safety glasses without the need of using any special tool or adversely affecting the beautiful appearance of the safety glasses.

SUMMARY OF THE INVENTION

A primary object of the present invention is to provide a nose-rest mechanism for safety glasses that allows easy and stable assembly and disassembly of a nose piece to and from a lens unit of safety glasses while gives the safety glasses a beautiful appearance.

To achieve the above and other objects, the nose-rest mechanism for safety glasses according to the present invention includes a lens unit, a fixing device, and a nose piece.

According to a first configuration of the present invention, the fixing device has two open lateral sides to define an inner receiving space, a lower opening formed between a bottom and a rear side facing toward a wearer, and at least one retaining hole provided on the rear side; the lens unit has a middle bridge section, which may be moved into the receiving space via the lower opening of the fixing device; and the nose piece includes two nose rests, and a first extended section upward extended from between the two nose rests and being provided with at least one projecting portion. Therefore, the nose piece could be easily, stably, and detachably connected to the lens unit by receiving and confining the middle bridge section of the lens unit and the first extended section of the nose piece to the receiving space of the fixing device with the projecting portion of the first extended section of the nose piece engaged with the retaining hole on the fixing device.

In a second configuration for the present invention, the lens unit is provided on a rear side of a middle bridge section with at least one projecting portion; the nose piece includes two nose rests, and a first extended section upward extended from between the two nose rests and being provided with at least one first through hole; and the fixing device has two open lateral sides and an open bottom to define an inner receiving space, and at least one second through hole provided on a rear side. Therefore, the nose piece could be easily, stably, and detachably connected to the lens unit by receiving and confining the middle bridge section of the lens unit and the first extended section of the nose piece to the receiving space of the fixing device with the projecting portion on the lens unit extended through the first through hole on the first extended section of the nose piece to engage with the second through hole on the fixing device.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
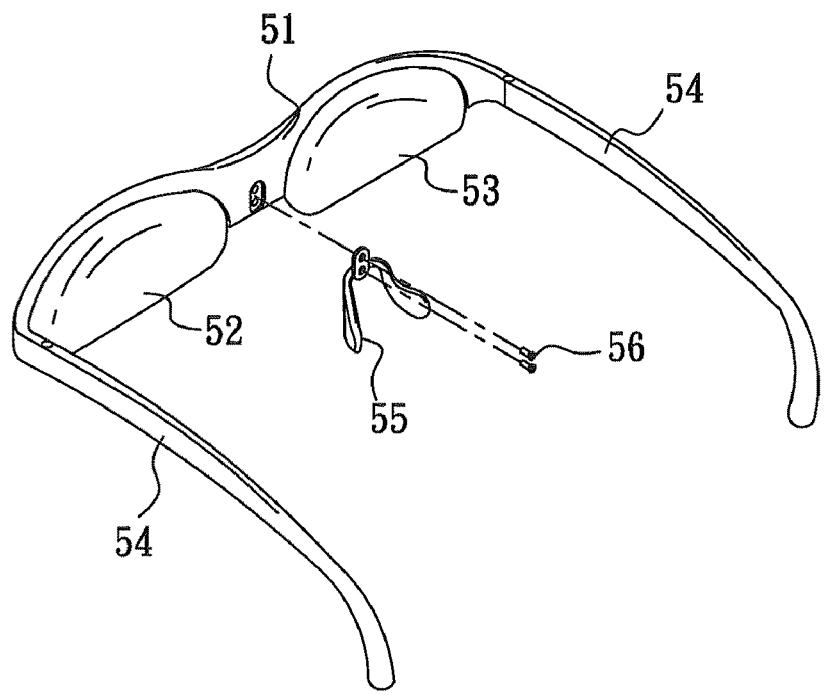
FIG. 1 is an exploded perspective view of a conventional nose piece for safety glasses.
Figure 2:
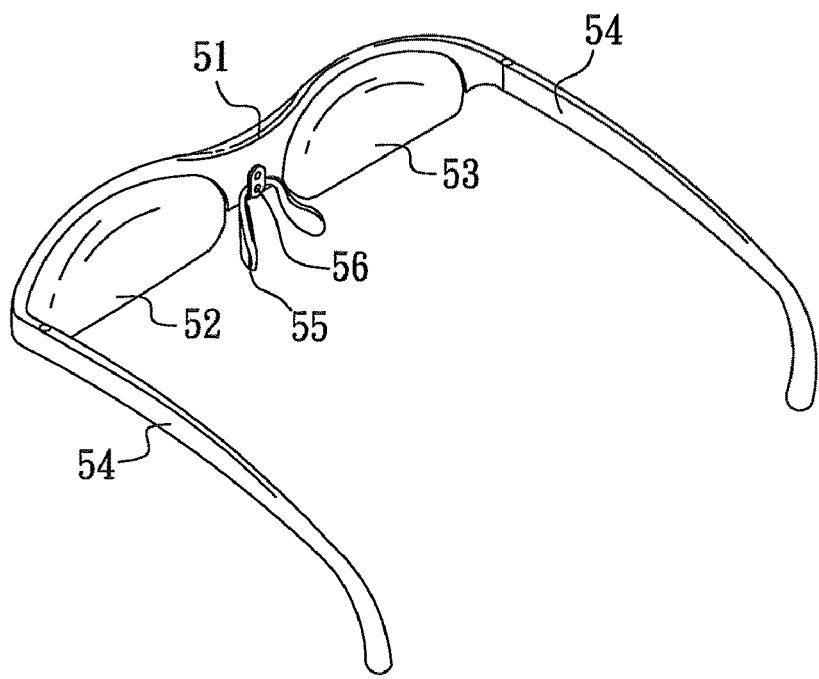
FIG. 2 is an assembled view of FIG. 1.
Figure 3:
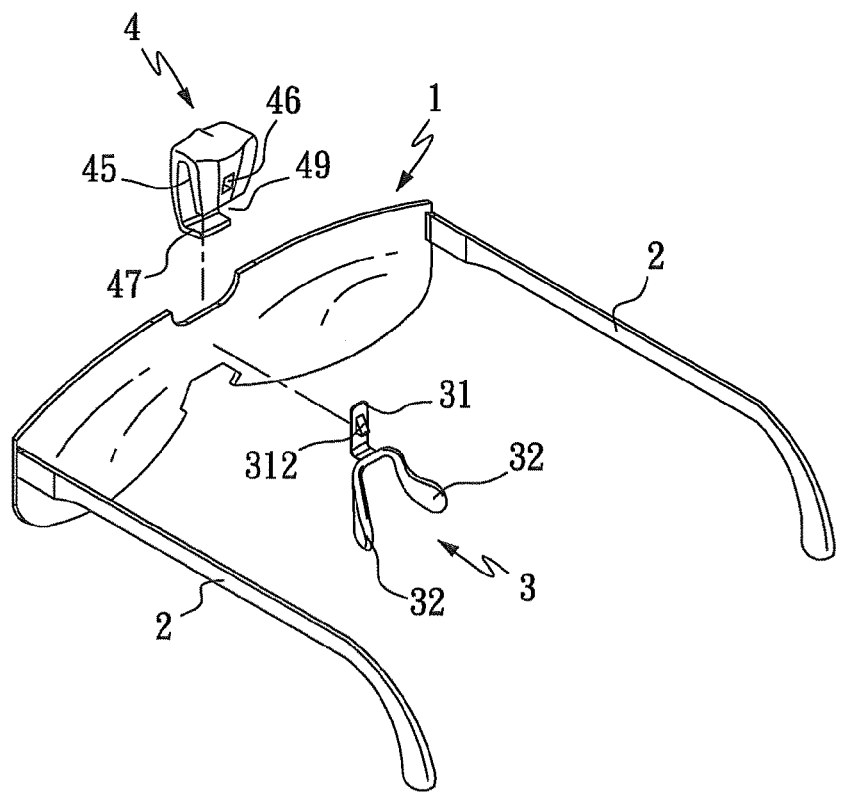
FIG. 3 is an exploded perspective view of a nose-rest mechanism for safety glasses according to a first embodiment of the present invention.
Figure 4:
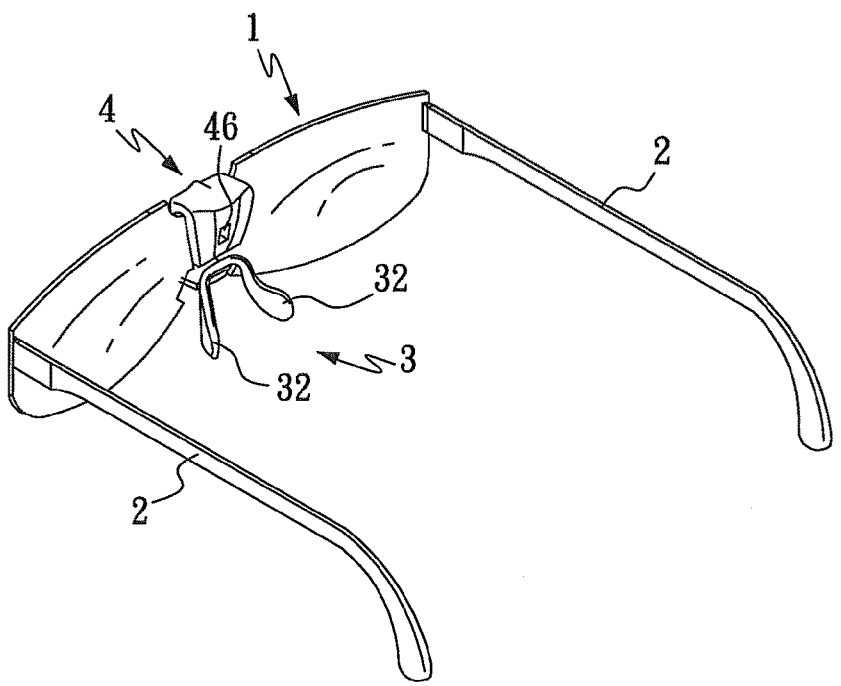
FIG. 4 is an assembled view of FIG. 3.
Figure 5:
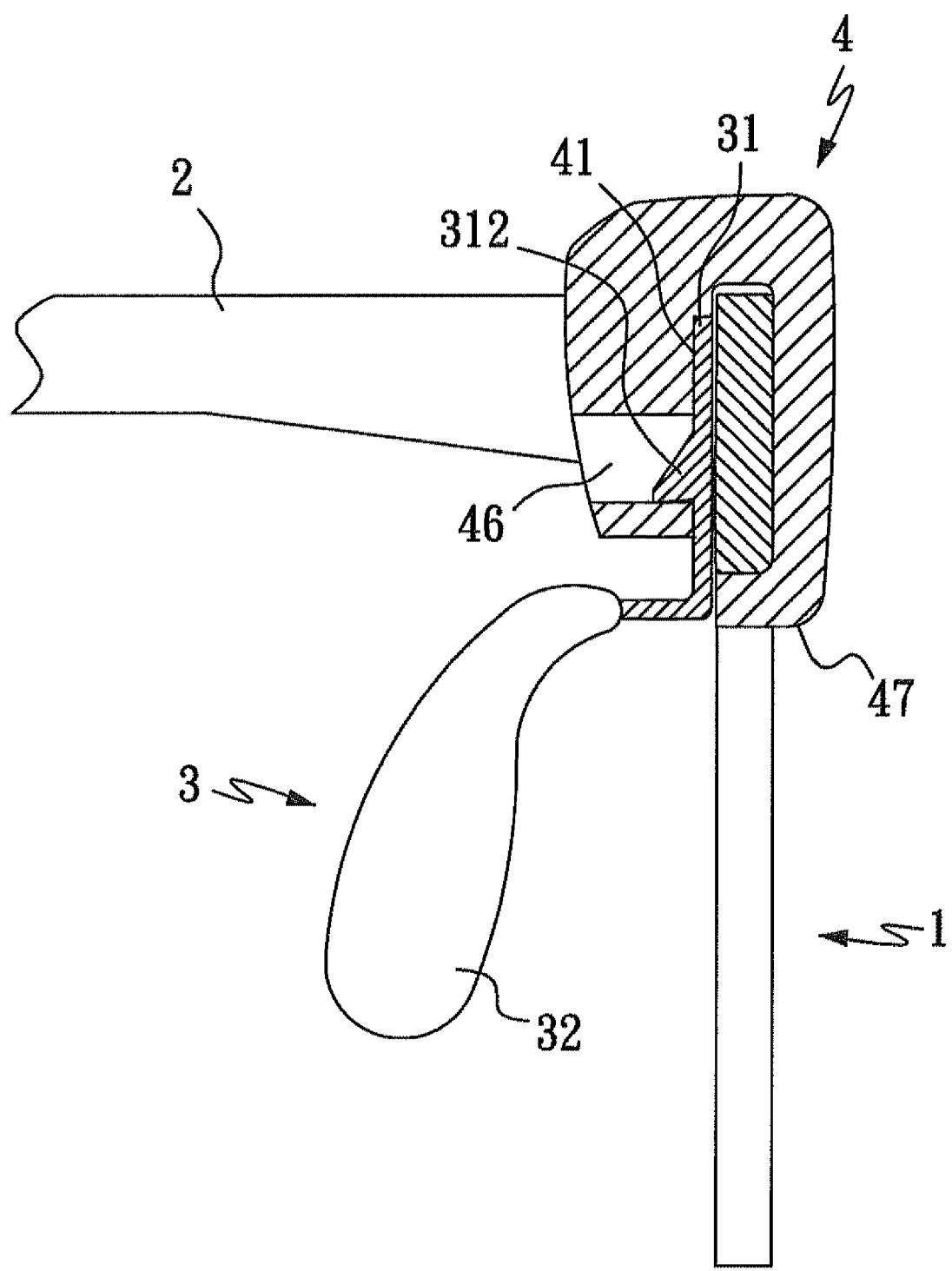
FIG. 5 is a fragmentary sectioned side view of FIG. 4.

Please refer to FIGS. 3 and 4 that are exploded and assembled perspective view, respectively, showing a nose-rest mechanism for safety glasses according to a first embodiment of the present invention, and to FIG. 5 that is a fragmentary sectioned side view of FIG. 4. As shown, in the first embodiment of the present invention, the nose-rest mechanism for safety glasses includes a lens unit 1, a nose piece 3, and a fixing device 4. Two temples 2 are separately connected to two lateral sides of the lens unit 1.

The fixing device 4 has two open lateral sides to define a receiving space 45 therein, and is formed on a rear side facing toward a glasses wearer, with at least one retaining hole 46 communicating with the receiving space 45. The fixing device 4 has a bottom 47 spaced from the rear side to thereby form a lower opening 49 therebetween.

The lens unit 1 is connected to the fixing device 4 by moving a middle bridge section of the lens unit 1 into the receiving space 45 via the lower opening 49.

The nose piece 3 is made of a flexible metal material, allowing two nose rests 32 thereof to be adjusted to a shape that adapts to the wearer's nose bridge. The nose rests 32 may be coated with a rubber cover each, so that the safety glasses are more comfortable for wearing. A first extended section 31 is upward extended from between the two nose rests 32, and includes at least one projecting portion 312 adapted to engage with the retaining hole 46 on the fixing device 4.

When the first extended section 31 is inserted into the receiving space 45 of the fixing device 4 via the lower opening 49 to engage the projecting portion 312 with the retaining hole 46, both the middle bridge section of the lens unit 1 and the nose piece 3 are more tightly confined in the receiving space 45.

The fixing device 4 is further provided on an inner surface of the rear side with a first receiving groove 41 communicating with the receiving space 45 for receiving the first extended section 31 therein, so that the nose piece 3 and the lens unit 1 are more fittingly and stably held to the fixing device 4.

With the above arrangements, the first extended section 31 is invisibly received in the fixing device 4 to ensure a beautiful appearance of the safety glasses. It is to be noted that the numbers of projecting portion 312 and retaining hole 46 may be increased to enhance the stable assembly of the nose piece 3 and the fixing device 4 to the lens unit 1.

Figure 6:
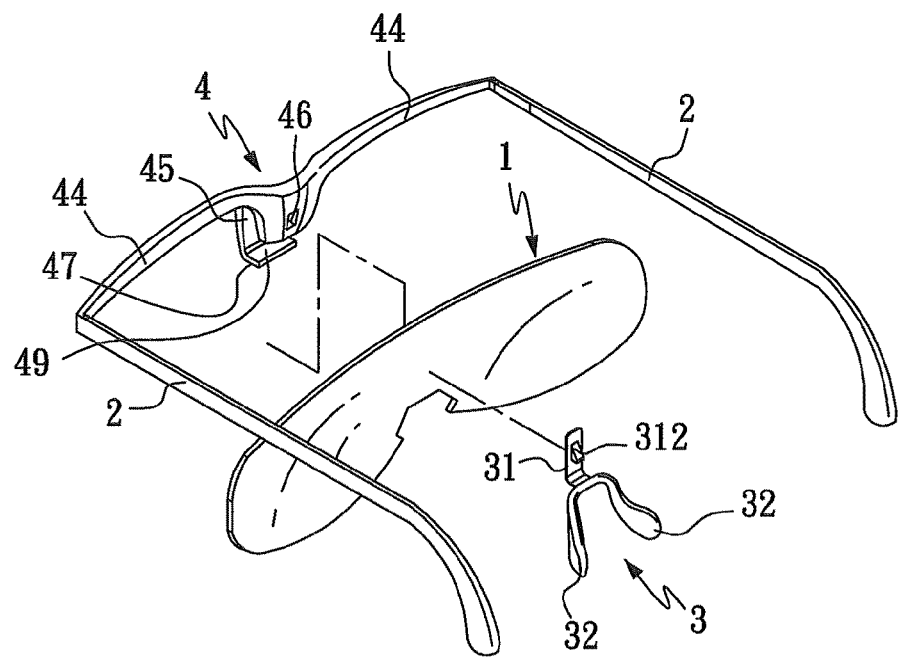
FIG. 6 is an exploded perspective view of a nose-rest mechanism for safety glasses according to a second embodiment of the present invention.
Figure 7:
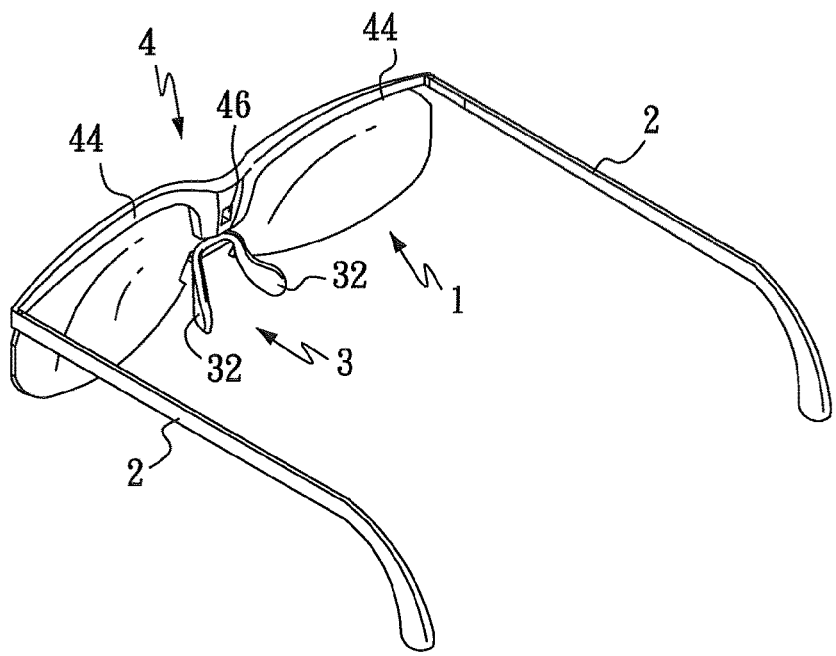
FIG. 7 is an assembled view of FIG. 6.

FIGS. 6 and 7 are exploded and assembled perspective views, respectively, showing a nose-rest mechanism for safety glasses according to a second embodiment of the present invention. As shown, the second embodiment is generally structurally similar to the first embodiment, except that the fixing device 4 is provided at two lateral upper corners with a laterally outward extended second extended section 44 each, and the two temples 2 are separately connected to the outer ends of the two second extended sections 44.

Figure 8:
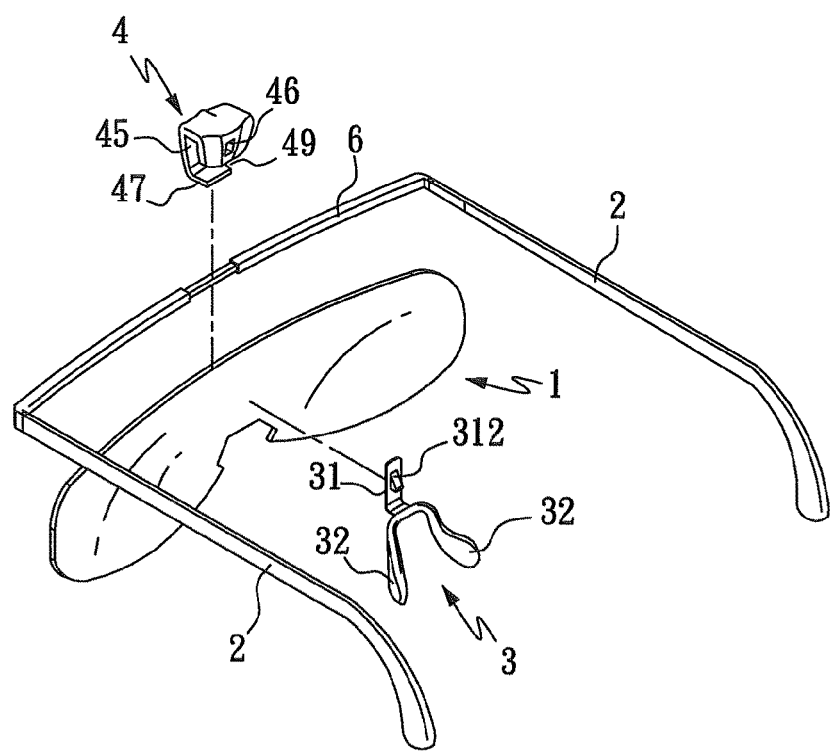
FIG. 8 is an exploded perspective view of a nose-rest mechanism for safety glasses according to a third embodiment of the present invention.
Figure 9:
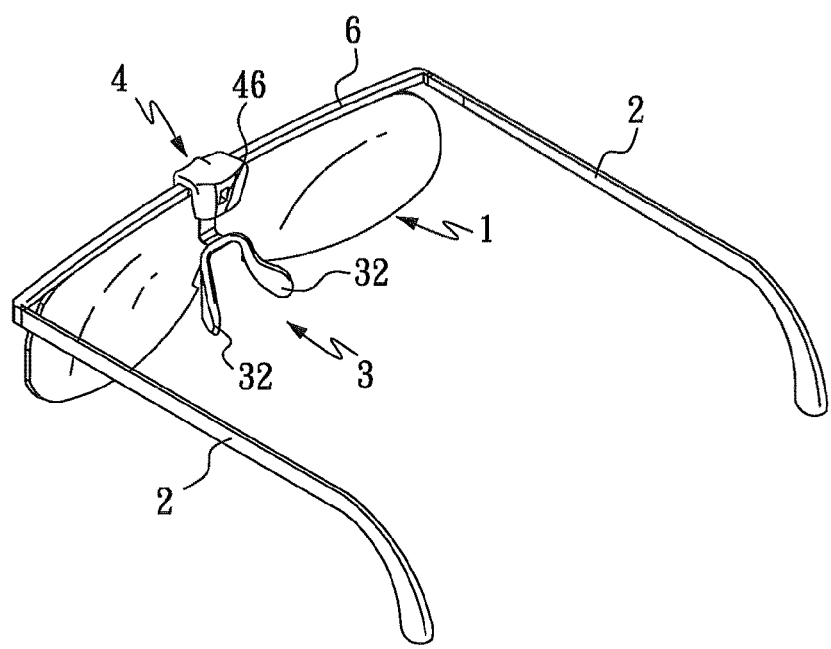
FIG. 9 is an assembled view of FIG. 8.
Figure 10:
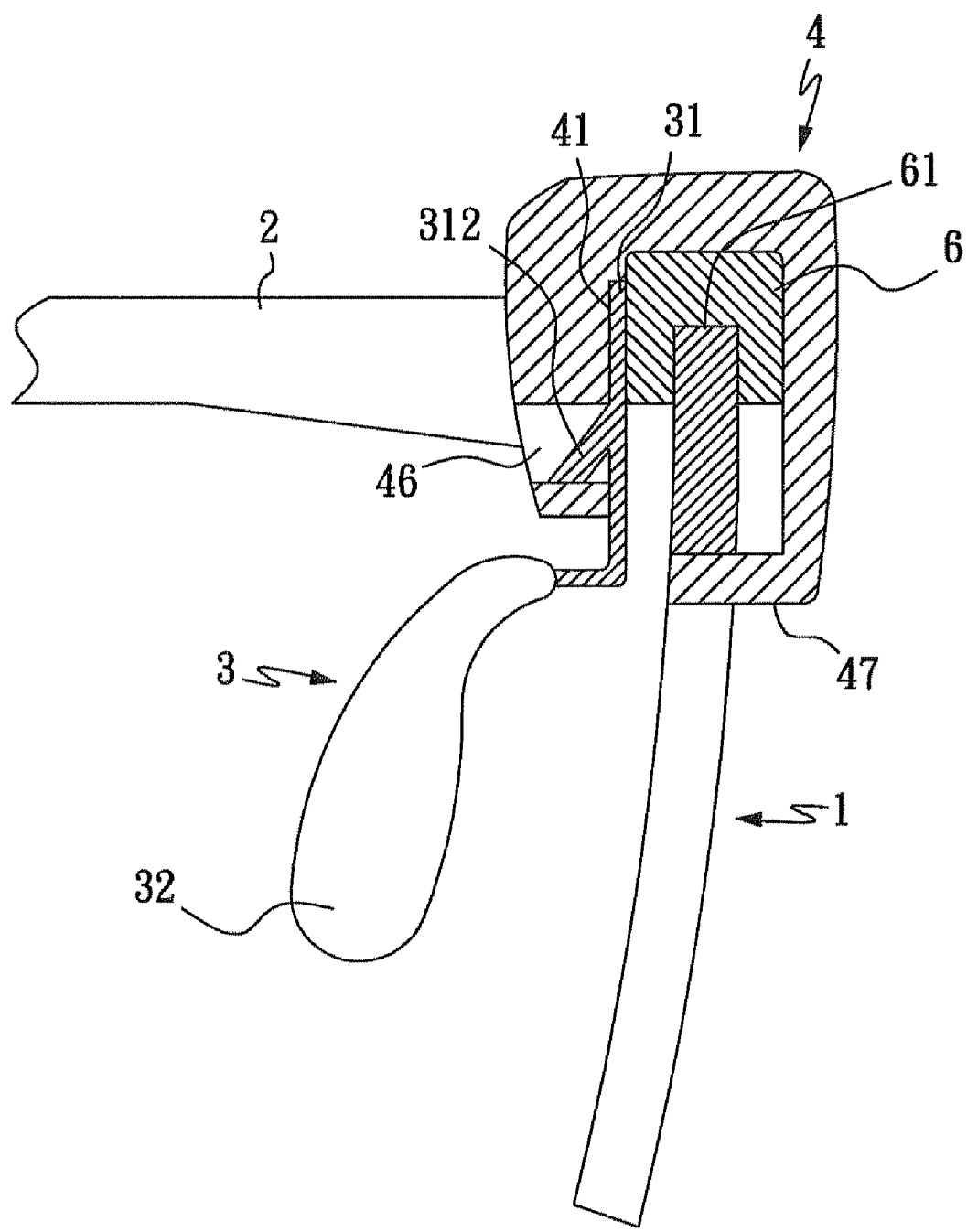
FIG. 10 is a fragmentary sectioned side view of FIG. 9.

Please refer to FIGS. 8 and 9 that are exploded and assembled perspective view, respectively, showing a nose-rest mechanism for safety glasses according to a third embodiment of the present invention, and to FIG. 10 that is a fragmentary sectioned side view of FIG. 9. As shown, the third embodiment is generally structurally similar to the first embodiment, but further includes a frame 6. The frame 6 is provided at a predetermined position with a second receiving groove 61 for receiving part of an upper edge of the lens unit 1 therein. A middle section of the frame 6, the middle bridge section of the lens unit 1, and the first extended section 31 of the nose piece 3 are all received in and confined to the receiving space 45 of the fixing device 4. Meanwhile, the two temples 2 are separately connected to two lateral outer ends of the frame 6.

Figure 11:
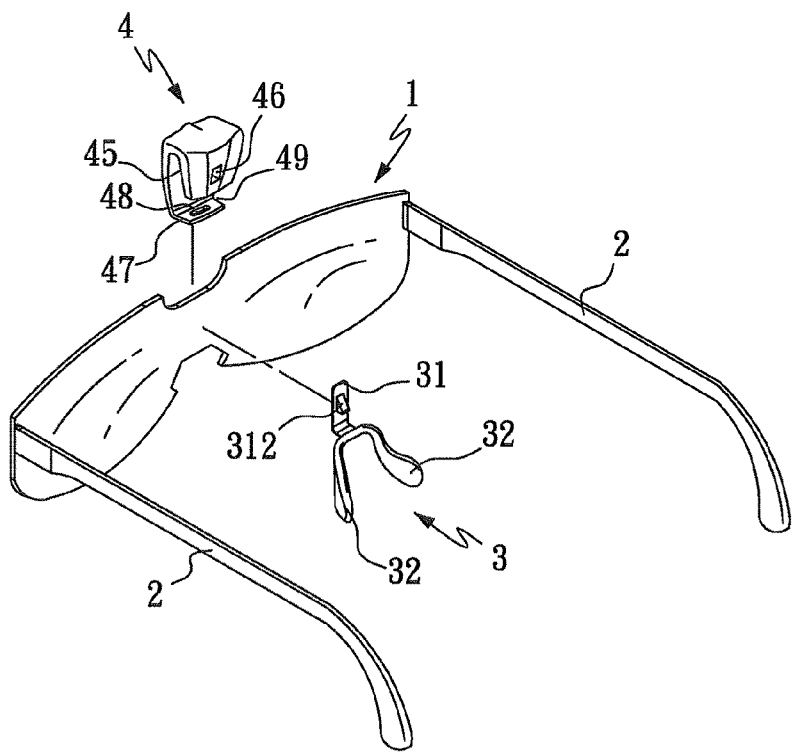
FIG. 11 is an exploded perspective view of a nose-rest mechanism for safety glasses according to a fourth embodiment of the present invention.
Figure 12:
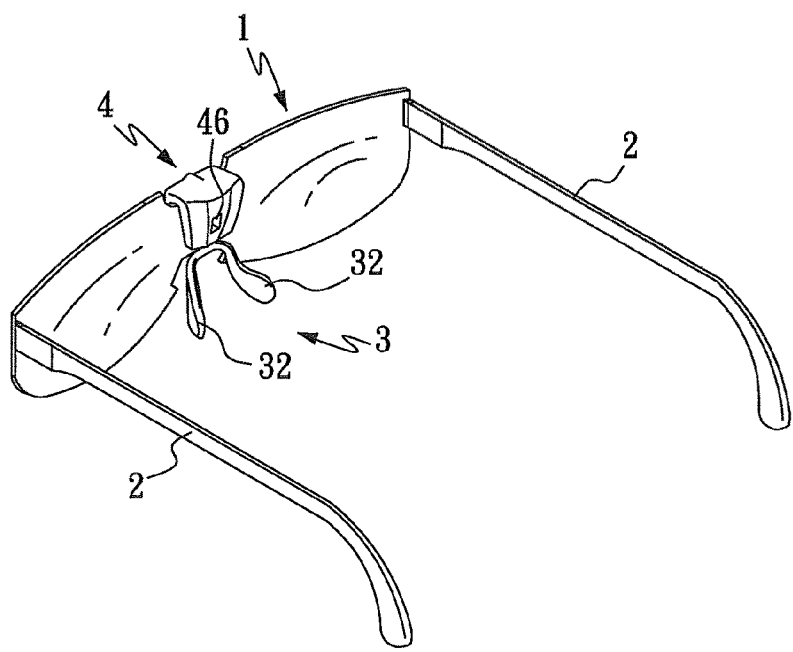
FIG. 12 is an assembled view of FIG. 11.
Figure 13:
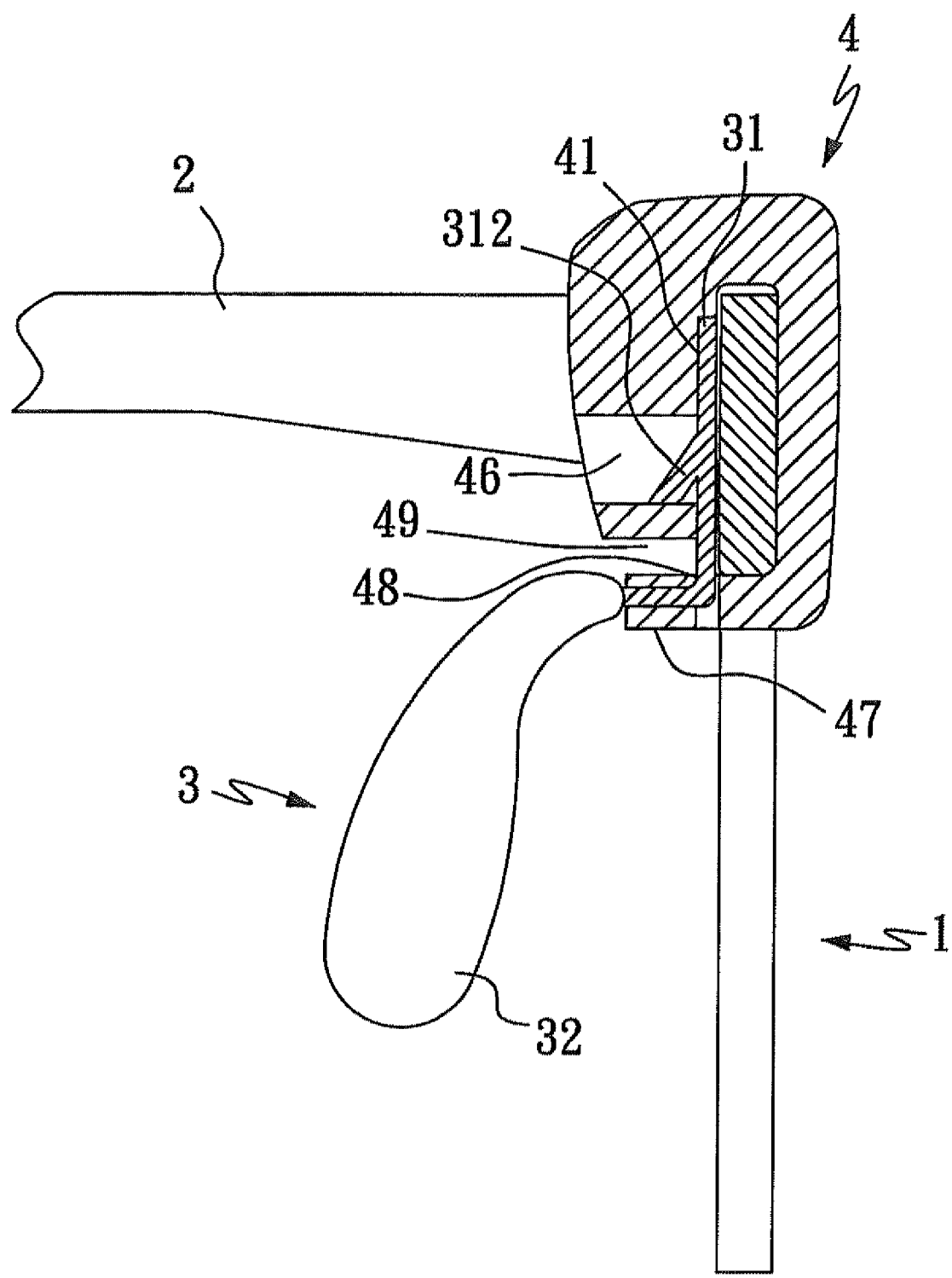
FIG. 13 is a fragmentary sectioned side view of FIG. 12.

Please refer to FIGS. 11 and 12 that are exploded and assembled perspective view, respectively, showing a nose-rest mechanism for safety glasses according to a fourth embodiment of the present invention, and to FIG. 13 that is a fragmentary sectioned side view of FIG. 12. As shown, the fourth embodiment is generally structurally similar to the first embodiment, except that the bottom 47 of the fixing device 4 is provided with a through hole 48, and the nose piece 3 is connected to the fixing device 4 by extending the first extended section 31 upward through the through hole 48 into the receiving space 45 to engage the projecting portion 312 with the retaining hole 46, so that the middle bridge section of the lens unit 1 and the first extended section 31 of the nose piece 3 are together received in and confined to the receiving space 45. With the projecting portion 312 engaged with the retaining hole 46 and a lower end of the first extended section 31 confined within the through hole 48, the lens unit 1 and the nose piece 3 are more fittingly and stably connected at the middle bridge section and the first extended section 31, respectively, to the fixing device 4. Again, the first extended section 31 is invisibly received in the fixing device 4 to ensure a beautiful appearance of the safety glasses, and the number of projecting portion 312 and retaining holes 46 may be increased to enhance the stable assembly of the nose piece 3 and the fixing device 4 to the lens unit 1.

Figure 14:
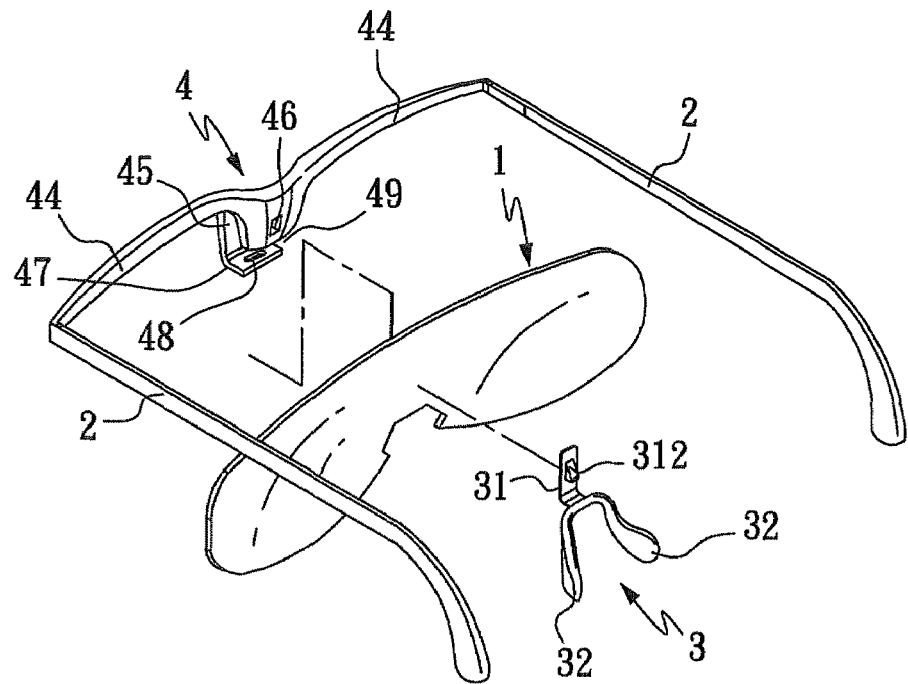
FIG. 14 is an exploded perspective view of a nose-rest mechanism for safety glasses according to a fifth embodiment of the present invention.
Figure 15:
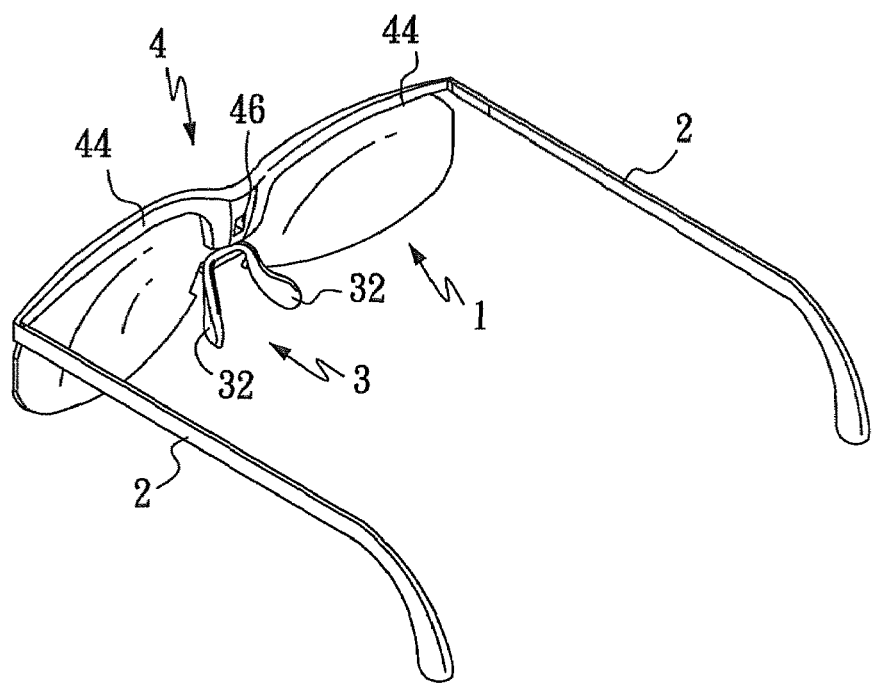
FIG. 15 is an assembled view of FIG. 14.

FIGS. 14 and 15 are exploded and assembled perspective view, respectively, showing a nose-rest mechanism for safety glasses according to a fifth embodiment of the present invention. As shown, the fifth embodiment is generally structurally similar to the fourth embodiment, except that the fixing device 4 is provided at two lateral upper corners with a laterally outward extended second extended section 44 each, and the two temples 2 are separately connected to the outer ends of the two second extended sections 44.

Figure 16:
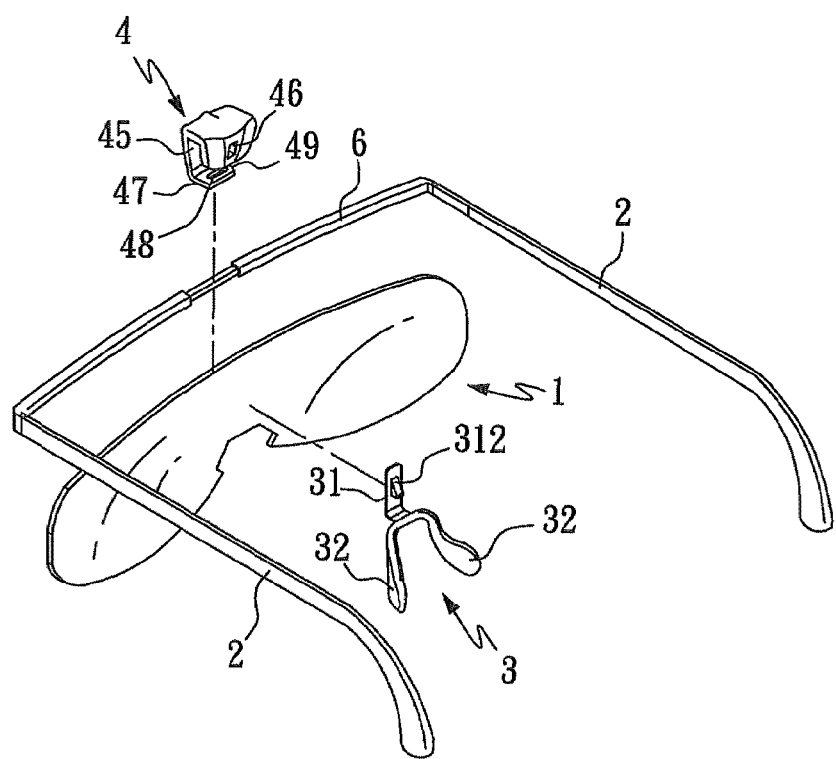
FIG. 16 is an exploded perspective view of a nose-rest mechanism for safety glasses according to a sixth embodiment of the present invention.
Figure 17:
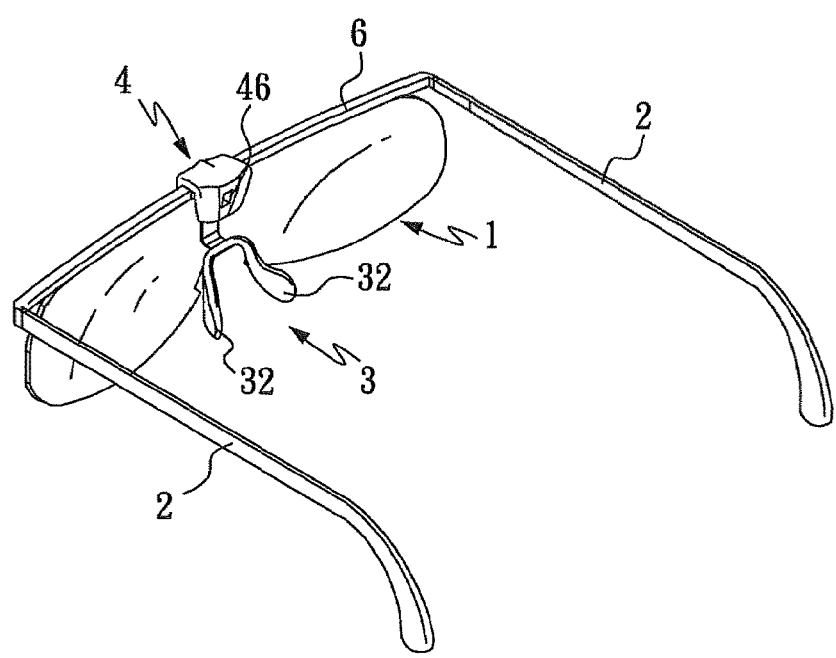
FIG. 17 is an assembled view of FIG. 16.
Figure 18:
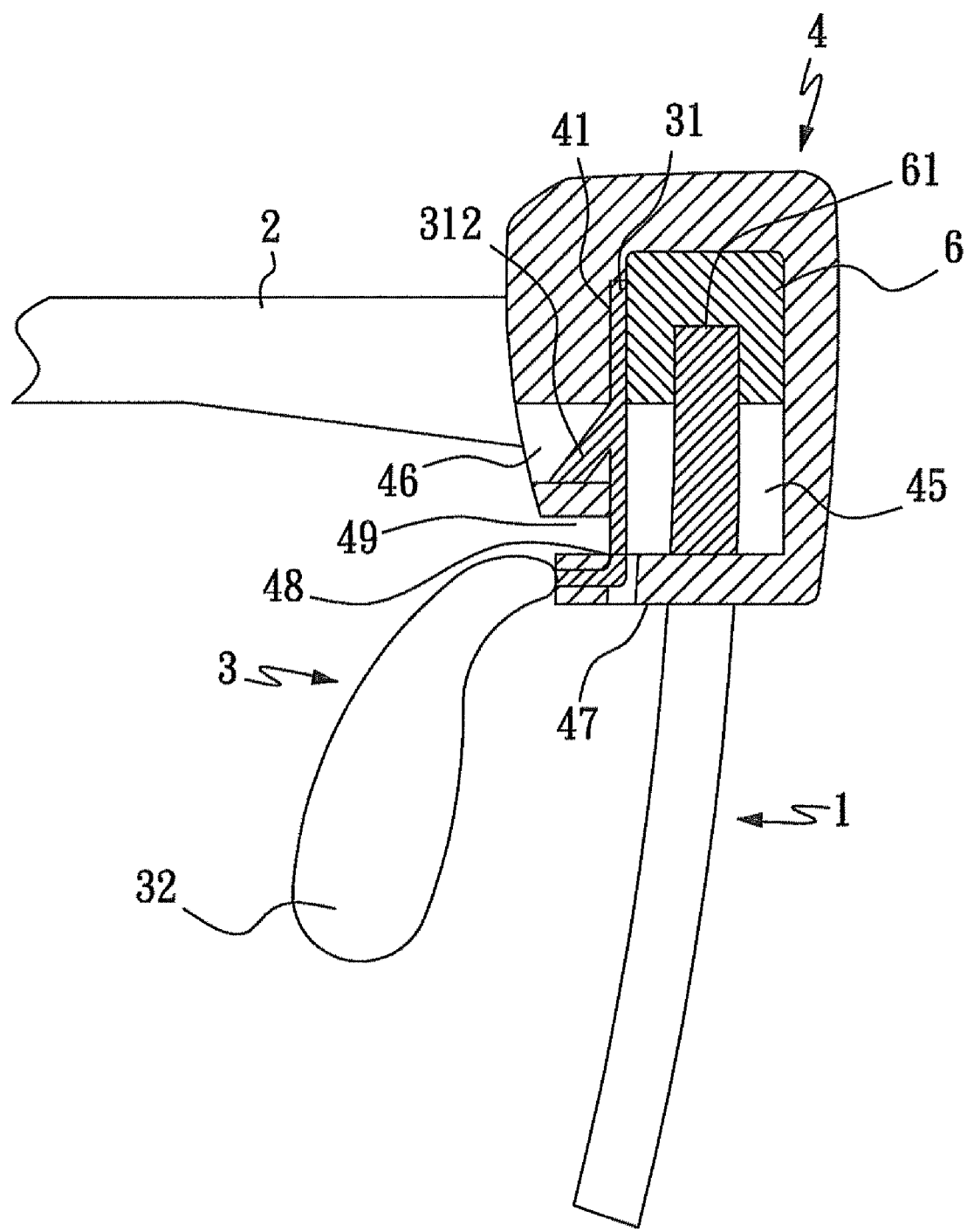
FIG. 18 is a fragmentary sectioned side view of FIG. 17.

Please refer to FIGS. 16 and 17 that are exploded and assembled perspective view, respectively, showing a nose-rest mechanism for safety glasses according to a sixth embodiment of the present invention, and to FIG. 18 that is a fragmentary sectioned side view of FIG. 17. As shown, the sixth embodiment is generally structurally similar to the fourth embodiment, but further includes a frame 6. The frame 6 is provided at a predetermined position with a second receiving groove 61 for receiving part of an upper edge of the lens unit 1 therein. A middle section of the frame 6, the middle bridge section of the lens unit 1, and the first extended section 31 of the nose piece 3 are all received in and confined to the receiving space 45 of the fixing device 4. Meanwhile, the two temples 2 are separately connected to two lateral outer ends of the frame 6.

Figure 19:
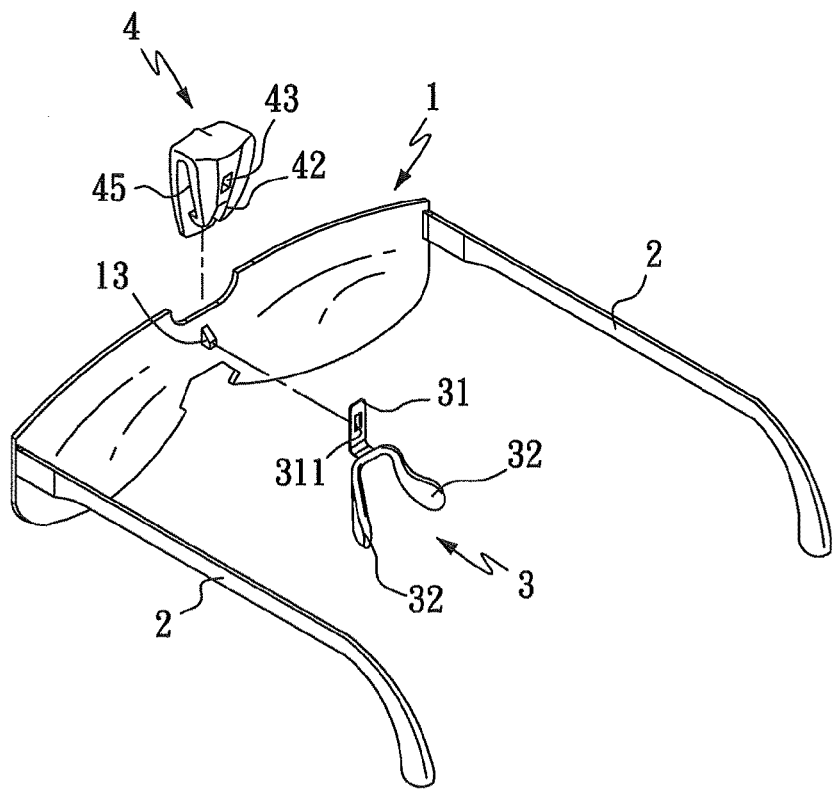
FIG. 19 is an exploded perspective view of a nose-rest mechanism for safety glasses according to a seventh embodiment of the present invention.
Figure 20:
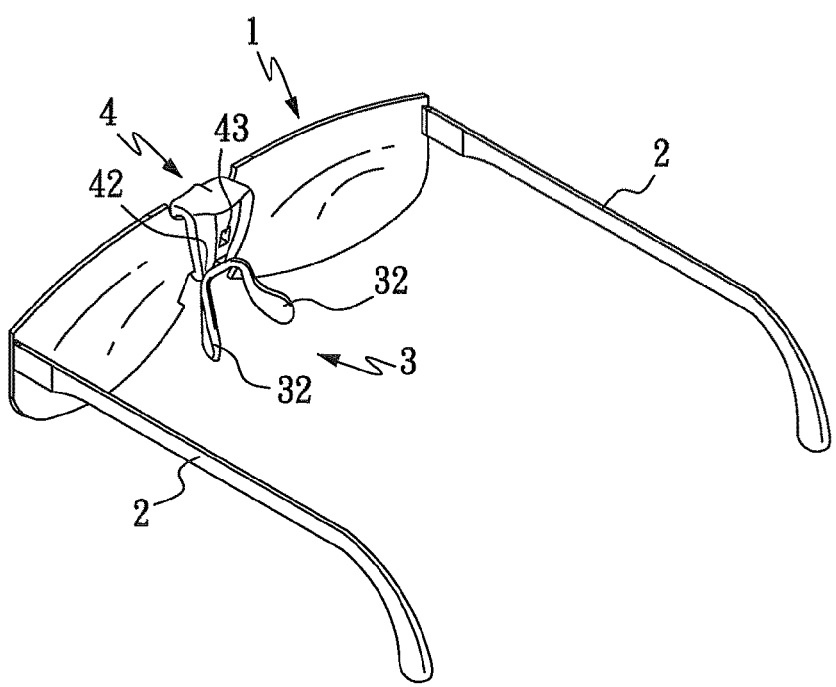
FIG. 20 is an assembled view of FIG. 19.
Figure 21:
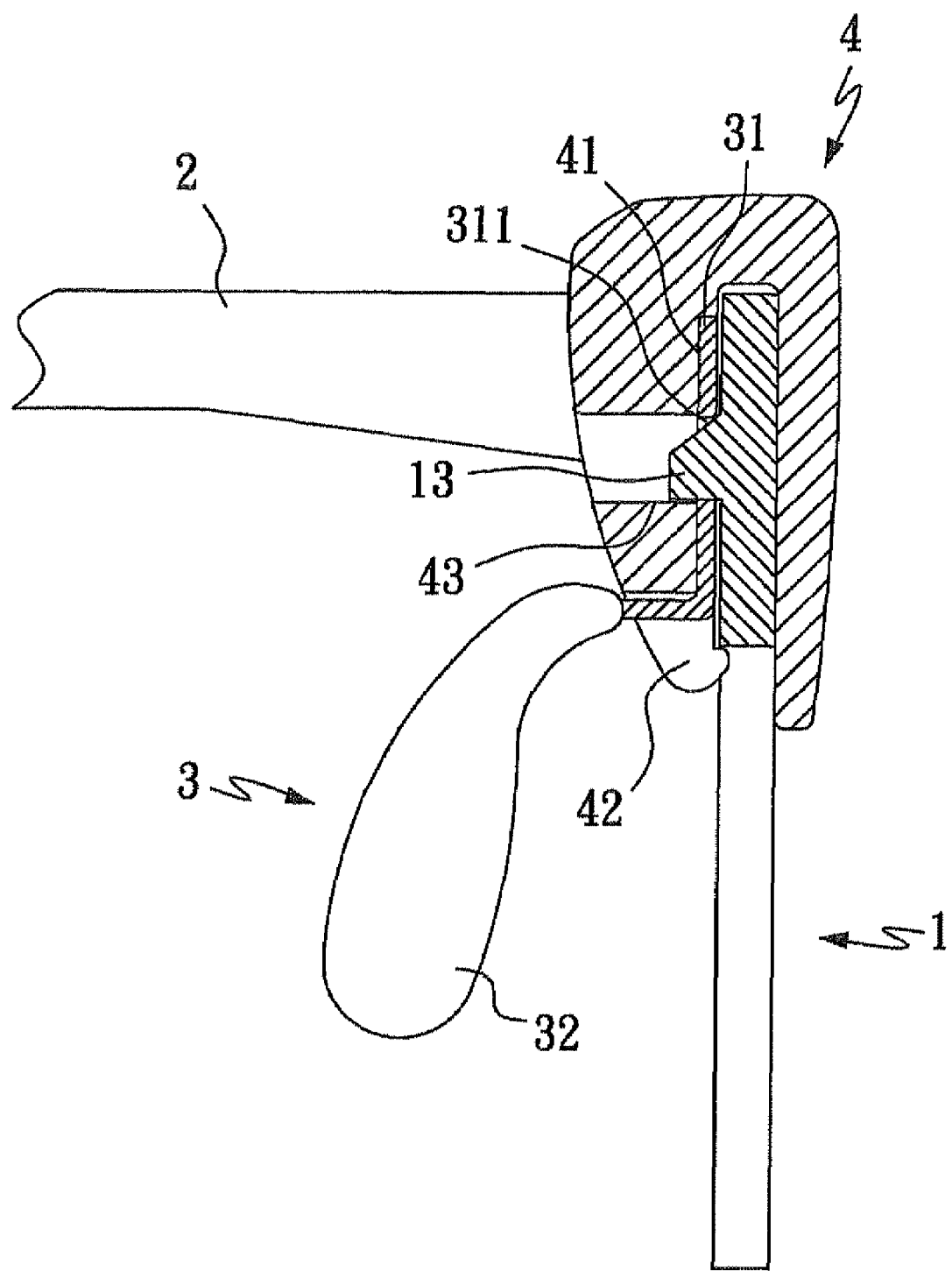
FIG. 21 is a fragmentary sectioned side view of FIG. 20.

Please refer to FIGS. 19 and 20 that are exploded and assembled perspective view, respectively, showing a nose-rest mechanism for safety glasses according to a seventh embodiment of the present invention, and to FIG. 21 that is a fragmentary sectioned side view of FIG. 20. As shown, in the seventh embodiment of the present invention, the nose-rest mechanism for safety glasses includes a lens unit 1, a nose piece 3, and a fixing device 4. Two temples 2 are separately connected to two lateral sides of the lens unit 1.

The lens unit 1 is provided at a middle bridge section thereof on a rear side facing toward a glasses wearer with at least one projecting portion 13.

The nose piece 3 is made of a flexible metal material, allowing two nose rests 32 thereof to be adjusted to a shape that adapts to the wearer's nose bridge. The nose rests 32 may be coated with a rubber cover each, so that the safety glasses are more comfortable for wearing. A first extended section 31 is extended upward from between the two nose rests 32, and includes at least one first through hole 311 adapted to engage with the projecting portion 13 on the lens unit 1.

The fixing device 4 has two open lateral sides and an open bottom to define a receiving space 45 therein, and is formed on a rear side facing toward the glasses wearer with at least one second through hole 43 communicating with the receiving space 45.

When the middle bridge section of the lens unit 1 and the first extended section 31 of the nose piece 3 are received in the receiving space 45 via the open bottom of the fixing device 4, the projecting portion 13 on the lens unit 1 is rearward extended through the first through hole 311 on the first extended section 31 to engage with the second through hole 43 on the fixing device 4.

The fixing device 4 is further provided on an inner surface of the rear side with a first receiving groove 41 communicating with the receiving space 45 for receiving the first extended section 31 therein, so that the nose piece 3 and the lens unit 1 are more fittingly and stably held to the fixing device 4. With the above arrangements, the first extended section 31 is invisibly received in the fixing device 4 to ensure a beautiful appearance of the safety glasses.

The fixing device 4 is also provided, at a lower rear end, with a support hook 42 for hooking and supporting a lower edge of the middle bridge section of the lens unit 1 thereon, so that the nose piece 3 and the fixing device 4 are more securely assembled to the lens unit 1.

It is to be noted that the number of projecting portion 13, first through hole 311, and second through hole 43 may be increased to ensure the stable assembly of the nose piece 3, the lens unit 1, and the fixing device 4 to one another.

Figure 22:
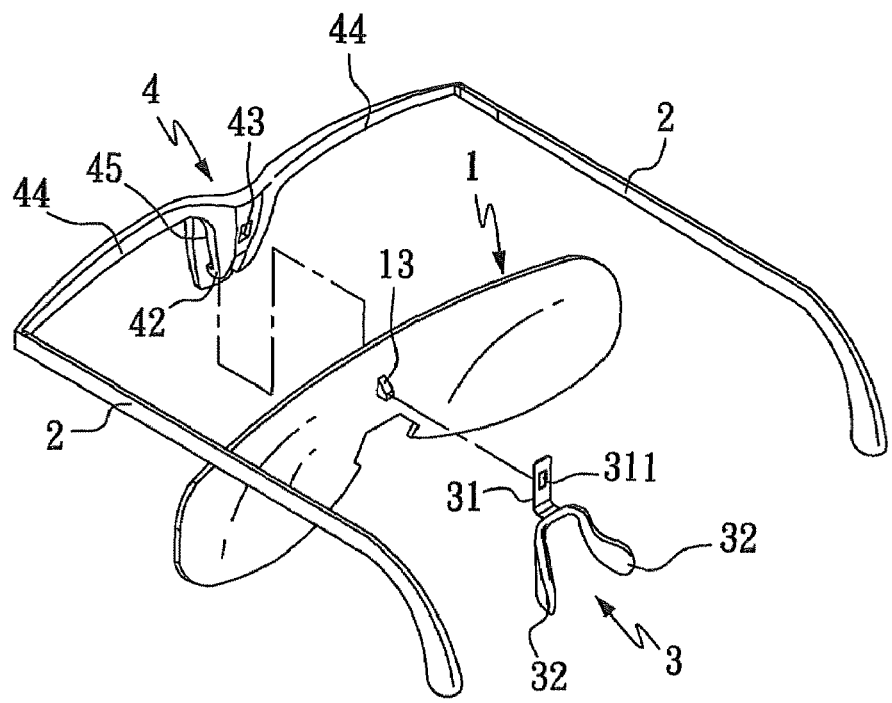
FIG. 22 is an exploded perspective view of a nose-rest mechanism for safety glasses according to an eighth embodiment of the present invention.
Figure 23:
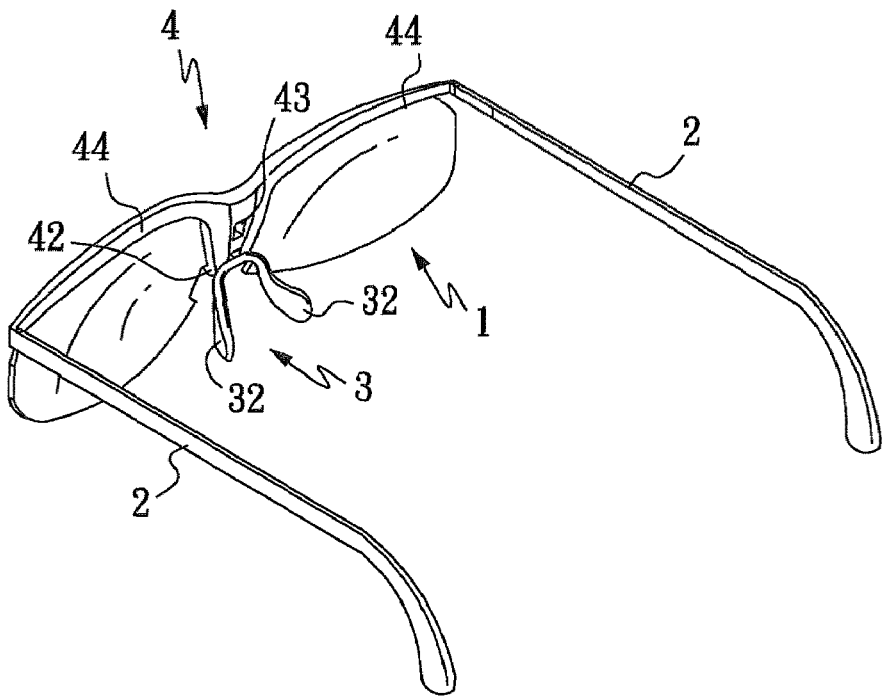
FIG. 23 is an assembled view of FIG. 22.

FIGS. 22 and 23 are exploded and assembled perspective view, respectively, showing a nose-rest mechanism for safety glasses according to an eighth embodiment of the present invention. As shown, the eighth embodiment is generally structurally similar to the seventh embodiment, except that the fixing device 4 is provided at two lateral upper corners with a laterally outward extended second extended section 44 each, and the two temples 2 are separately connected to the outer ends of the two second extended sections 44.

Figure 24:
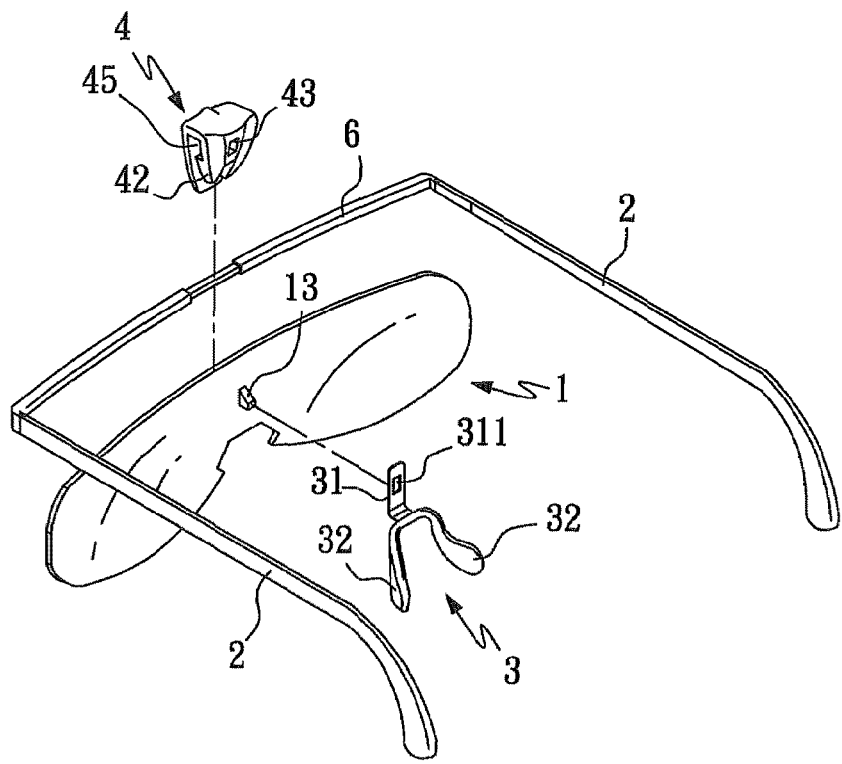
FIG. 24 is an exploded perspective view of a nose-rest mechanism for safety glasses according to a ninth embodiment of the present invention.
Figure 25:
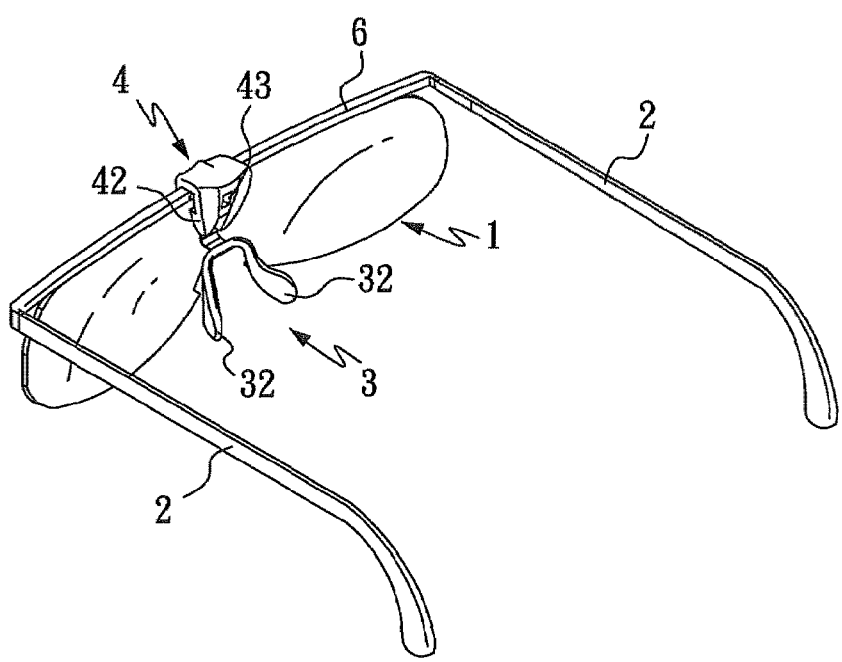
FIG. 25 is an assembled view of FIG. 24.
Figure 26:
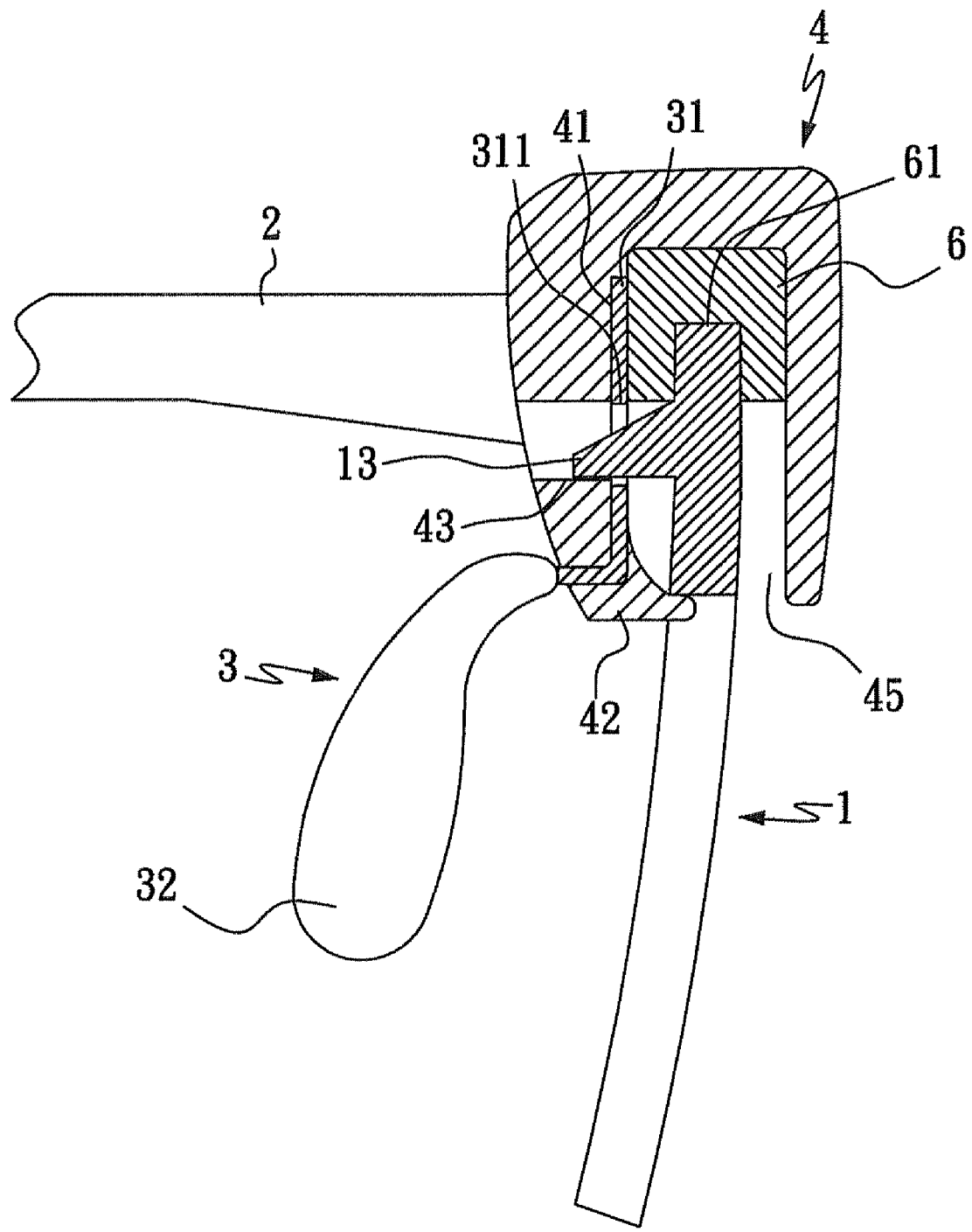
FIG. 26 is a fragmentary sectioned side view of FIG. 25.

Please refer to FIGS. 24 and 25 that are exploded and assembled perspective view, respectively, showing a nose-rest mechanism for safety glasses according to a ninth embodiment of the present invention, and to FIG. 26 that is a fragmentary sectioned side view of FIG. 25. As shown, the ninth embodiment is generally structurally similar to the seventh embodiment, but further includes a frame 6. The frame 6 is provided at a predetermined position with a second receiving groove 61 for receiving part of an upper edge of the lens unit 1 therein. A middle section of the frame 6, the middle bridge section of the lens unit 1, and the first extended section 31 of the nose piece 3 are all received in and confined to the receiving space 45 of the fixing device 4. Meanwhile, the two temples 2 are separately connected to two lateral outer ends of the frame 6.

With the above arrangements, the nose-rest mechanism for safety glasses according to the present invention allows the nose piece 3 to be easily, stably, immovably, and detachably associated with the middle bridge section of the lens unit 1 via the fixing device 4 while maintains the safety glasses in a beautiful appearance. Therefore, the present invention effectively overcomes the drawbacks in the conventional nose piece for safety glasses and makes the safety glasses more practical for wearing.

What is claimed is:

1. A nose-rest mechanism for safety glasses, comprising:
   a lens unit having a middle bridge section;
   a fixing device having two open lateral sides to define a receiving space therein, and being provided on a rear side facing toward a glasses wearer with at least one retaining hole communicating with the receiving space; and a bottom of the fixing device being spaced from the rear side to define a lower opening between the bottom and the rear side, so that the middle bridge section of the lens unit may be moved into the receiving space via the lower opening of the fixing device; and
   a nose piece including two nose rests and a first extended section upward extended from between the two nose rests; the first extended section being provided with at least one projecting portion adapted to engage with the retaining hole on the fixing device, so that both the middle bridge section of the lens unit and the first extended section of the nose piece are received in and confined to the receiving space of the fixing device.

2. The nose-rest mechanism for safety glasses as claimed in claim 1, wherein the bottom of the fixing device is provided with a through hole, via which the first extended section of the nose piece is upward extended into the receiving space to engage the projecting portion with the retaining hole of the fixing device.

3. The nose-rest mechanism for safety glasses as claimed in claim 2, wherein the lens unit is connected at two lateral outer ends to a temple each.

4. The nose-rest mechanism for safety glasses as claimed in claim 2, wherein the nose piece is made of a flexible metal material.

5. The nose-rest mechanism for safety glasses as claimed in claim 2, wherein the nose rests are coated with a rubber cover each.

6. The nose-rest mechanism for safety glasses as claimed in claim 2, wherein the fixing device is further provided on an inner surface of the rear side with a first receiving groove communicating with the receiving space for receiving the first extended section of the nose piece therein.

7. The nose-rest mechanism for safety glasses as claimed in claim 2, wherein the fixing device is provided at two lateral upper corners with a laterally outward extended second extended section each, and the fixing device is connected at the outer ends of the two second extended sections to a temple each.

8. The nose-rest mechanism for safety glasses as claimed in claim 2, further comprising a frame, and the frame being provided at a predetermined position with a second receiving groove for receiving part of an upper edge of the lens unit therein; such that a middle section of the frame, the middle bridge section of the lens unit, and the first extended section of the nose piece are together received in and confined to the receiving space of the fixing device, and the frame is connected at two outer ends to a temple each.

9. The nose-rest mechanism for safety glasses as claimed in claim 1, wherein the lens unit is connected at two lateral outer ends to a temple each.

10. The nose-rest mechanism for safety glasses as claimed in claim 1, wherein the nose piece is made of a flexible metal material.

11. The nose-rest mechanism for safety glasses as claimed in claim 1, wherein the nose rests are coated with a rubber cover each.

12. The nose-rest mechanism for safety glasses as claimed in claim 1, wherein the fixing device is further provided on an inner surface of the rear side with a first receiving groove communicating with the receiving space for receiving the first extended section of the nose piece therein.

13. The nose-rest mechanism for safety glasses as claimed in claim 1, wherein the fixing device is provided at two lateral upper corners with a laterally outward extended second extended section each, and the fixing device is connected at the outer ends of the two second extended sections to a temple each.

14. The nose-rest mechanism for safety glasses as claimed in claim 1, further comprising a frame, and the frame being provided at a predetermined position with a second receiving groove for receiving part of an upper edge of the lens unit therein; such that a middle section of the frame, the middle bridge section of the lens unit, and the first extended section of the nose piece are together received in and confined to the receiving space of the fixing device, and the frame is connected at two outer ends to a temple each.

15. A nose-rest mechanism for safety glasses, comprising:
a lens unit having a middle bridge section, and at least one projecting portion provided on a rear side of the middle bridge section facing toward a glasses wearer;
a nose piece including two nose rests and a first extended section upward extended from between the two nose rests; and the first extended section being provided with at least one first through hole adapted to engage with the projecting portion on the lens unit; and
a fixing device having two open lateral sides and an open bottom to define a receiving space therein, and being provided on a rear side facing toward the glasses wearer with at least one second through hole communicating with the receiving space;
whereby when the middle bridge section of the lens unit and the first extended section of the nose piece are received in the receiving space via the open bottom of the fixing device, the projecting portion on the lens unit is rearward extended through the first through hole on the first extended section of the nose piece to engage with the second through hole on the fixing device.

16. The nose-rest mechanism for safety glasses as claimed in claim 15, wherein the lens unit is connected at two lateral outer ends to a temple each.

17. The nose-rest mechanism for safety glasses as claimed in claim 15, wherein the nose piece is made of a flexible metal material.

18. The nose-rest mechanism for safety glasses as claimed in claim 15, wherein the nose rests are coated with a rubber cover each.

19. The nose-rest mechanism for safety glasses as claimed in claim 15, wherein the fixing device is further provided on an inner surface of the rear side with a first receiving groove communicating with the receiving space for receiving the first extended section of the nose piece therein.

20. The nose-rest mechanism for safety glasses as claimed in claim 15, wherein the fixing device is provided at a lower rear end with a support hook for hooking and supporting a lower edge of the middle bridge section of the lens unit thereon.

21. The nose-rest mechanism for safety glasses as claimed in claim 15, wherein the fixing device is provided at two lateral upper corners with a laterally outward extended second extended section each, and the fixing device is connected at the outer ends of the two second extended sections to a temple each.

22. The nose-rest mechanism for safety glasses as claimed in claim 15, further comprising a frame, and the frame being provided at a predetermined position with a second receiving groove for receiving part of an upper edge of the lens unit therein; such that a middle section of the frame, the middle bridge section of the lens unit, and the first extended section of the nose piece are together received in and confined to the receiving space of the fixing device, and the frame is connected at two outer ends to a temple each.

\* \* \* \* \*